(12) United States Patent
Breton (10) Patent No.: US 11,774,326 B2
(45) Date of Patent: Oct. 3, 2023

(54) HEAVY DUTY ENGINE REGULATORY TESTING FOR IDENTIFYING TORQUE OR ENERGY LOSS BASED ON HEAT TRANSFER

(71) Applicant: HORIBA INSTRUMENTS INCORPORATED, Irvine, CA (US)

(72) Inventor: Leo Alphonse Gerard Breton, Washington, DC (US)

(73) Assignee: HORIBA Instruments Incorporated, Irvine, CA (US)

( * ) Notice: Subject to any disclaimer, the term of this patent is extended or adjusted under 35 U.S.C. 154(b) by 39 days.

(21) Appl. No.: 17/607,710

(22) PCT Filed: Apr. 29, 2020

(86) PCT No.: PCT/US2020/030529
§ 371 (c)(1),
(2) Date: Oct. 29, 2021

(87) PCT Pub. No.: WO2020/223389
PCT Pub. Date: Nov. 5, 2020

(65) Prior Publication Data
US 2022/0221376 A1    Jul. 14, 2022

Related U.S. Application Data

(60) Provisional application No. 62/840,227, filed on Apr. 29, 2019.

(51) Int. Cl.
G01M 15/05    (2006.01)
G01M 15/02    (2006.01)

(52) U.S. Cl.
CPC .......... *G01M 15/05* (2013.01); *G01M 15/02* (2013.01)

(58) Field of Classification Search
CPC ............................. G01M 15/02; G01M 15/05
See application file for complete search history.

(56) References Cited

U.S. PATENT DOCUMENTS

| 5,157,965 A | 10/1992 | Koegeler et al. |
| 6,212,945 B1 | 4/2001 | Moskwa |

(Continued)

FOREIGN PATENT DOCUMENTS

| CN | 107132050 A | 9/2017 |
| EP | 3428606 A1 | 1/2019 |

OTHER PUBLICATIONS

International Search Report and Written Opinion of the International Searching Authority dated Jul. 20, 2020, for International application No. PCT/US2020/030529, filed Apr. 29, 2020, 7 pgs.

(Continued)

*Primary Examiner* — Eric S. McCall
(74) *Attorney, Agent, or Firm* — Brooks Kushman, P.C.

(57) ABSTRACT

A method for testing an engine in a vehicle includes arranging a bath separate from the vehicle configured to cool a driveline component of the vehicle, adjusting a temperature of the driveline component to a target temperature, and responsive to the driveline component achieving the target temperature, operating the engine according to a mapping procedure, and controlling the bath to maintain the temperature of the driveline component at the target temperature during the operating. The method further includes measuring heat transfer from the driveline component to the bath during the operating, and calculating torque loss or energy loss of the driveline component during the operating based on the heat transfer.

15 Claims, 3 Drawing Sheets

(56) References Cited

U.S. PATENT DOCUMENTS

| | | | |
|---|---|---|---|
| 2003/0150258 A1 | 8/2003 | Moskwa et al. | |
| 2008/0173103 A1 | 7/2008 | Shimizu et al. | |
| 2013/0255605 A1* | 10/2013 | Jentz | F01P 11/16 |
| | | | 123/41.15 |
| 2020/0324619 A1* | 10/2020 | Duan | B60H 1/0073 |

OTHER PUBLICATIONS

International Preliminary Report on Patentability and Written Opinion of the International Searching Authority dated Nov. 11, 2021, for International application No. PCT/US2020/030529, filed Apr. 29, 2020, 7 pgs.

* cited by examiner

HEAVY DUTY ENGINE REGULATORY TESTING FOR IDENTIFYING TORQUE OR ENERGY LOSS BASED ON HEAT TRANSFER

CROSS-REFERENCE TO RELATED APPLICATIONS

This application is the U.S. national phase of PCT Application No. PCT/US2020/030529, filed Apr. 29, 2020, which claims the benefit of U.S. provisional application Ser. No. 62/840,227, filed Apr. 29, 2019, the disclosures of which are hereby incorporated in their entirety by reference herein.

BACKGROUND

The present disclosure is in the technical field of automotive exhaust gas emissions measurement and analysis and the measurement of the energy efficiency of internal combustion engines. More specifically, it is in the field of measuring the exhaust gas emissions and brake specific fuel consumption of heavy duty engines (HDEs), i.e. Internal Combustion Engines (IEs) that are normally found in trucks.

Heavy-duty engines are found in trucks ranging in size from pickup trucks to Class 8 tractors having a combined tractor/trailer gross vehicle weight of up to 85,000 pounds in the United States. The engines are tested and certified for United States Environmental Protection Agency (EPA) and California EPA emissions compliance requirements using laboratory-based engine dynamometers and EPA testing cycles and procedures.

Unlike emissions testing for passenger cars, some small trucks and Sport Utility Vehicles (SUVs), EPA testing requirements for HDEs does not employ a chassis dynamometer. Rather than place the entire vehicle on a chassis dynamometer and operate over a prescribed vehicle speed vs. time schedule, HDEs are normally tested using an engine dynamometer operating over a prescribed engine speed and engine load vs. time schedule. This is because heavy-duty chassis dynamometers have to be much larger and more expensive than light-duty chassis dynamometers and because there are many different truck chassis types, sizes, and weights that a particular engine model may be found in. Therefore, it is more convenient for engine manufacturers to demonstrate compliance with emissions standards on an engine dynamometer over standard engine test cycles compared with demonstrating the compliance of every engine/vehicle combination that may be entered into commerce.

But federal regulatory emissions compliance requirements continue to apply to older engines still within their regulatory-defined "useful life," once they have been sold and entered into commerce in any truck chassis. For this reason, EPA employs a 3-stage compliance program for ensuring emissions compliance of heavy-duty engines. First, new engines must be shown to be compliant based on testing data from engine dynamometer testing of a representative engine, usually done by an engine manufacturer but sometimes confirmed by the regulators; second, EPA has the authority to conduct Selective Enforcement Audit (SEA) engine testing of new engines on an engine dynamometer as they are being manufactured; third, EPA has the authority to test "in-use" engines that are still within their regulatory "useful life," i.e. engines that have already entered into commerce in a truck chassis and are still within age and mileage requirements.

The first two types of regulatory testing are conducted on new engines that have never been in a vehicle chassis and have accumulated no road mileage. The third type of regulatory testing, i.e. "in-use" testing has always been much more difficult to conduct for both regulators and the engine manufacturers, or Original Equipment Manufacturers (OEMs) because it requires removal of the engine to be tested from the vehicle chassis. And "in-use" testing has been much more difficult for regulators to conduct because various electronic sensor signals, normally associated with sensors from the vehicle chassis, may be required by the engine's controller, or Engine Control Unit (ECU). Regulators do not normally have access to the detailed technical information that may be necessary to properly simulate such chassis-based sensor signals, if it is even possible to do this without changing the test results from what is representative of real-world usage.

Inspection and Maintenance Testing (I/M Testing) of vehicles is another type of emissions testing often performed by governments, in this case state or local governments. For I/M testing failures, it is normally the owner of the vehicle that is responsible for making the necessary repairs to bring the vehicle back into acceptable compliance. While I/M testing of light duty vehicles has been relatively commonplace for many years, I/M testing of trucks operating in the real world has been very limited because of the need for testing to be performed with engine dynamometers. For this reason, it has been mostly limited to testing of engines for excessive tailpipe smoke during snap-idle events and other limited testing procedures.

The successful application of Real-world Portable Emissions Measurement System (PEMS) testing of heavy-duty vehicles for "in-use" heavy-duty vehicles in the United States has been limited because of the overly-restrictive requirements necessary for valid test points related to the adopted testing procedures. The EPA Not-To-Exceed (NTE) testing protocol's engine operating zone requirements, combined with a required continuous operation within the NTE zone for relatively long periods usually results in only a small proportion of total engine operation being represented in the final test results. For this reason and because of the difficulties associated with testing "in-use" HDEs on engine dynamometers mentioned above, there exists the need for a HIDE "in-use" testing apparatus and associated protocol to test HDEs in a manner consistent with traditional laboratory-based regulatory testing protocols, but without needing to remove engines from the heavy-duty vehicle chassis prior to testing.

SUMMARY

This disclosure concerns a testing apparatus and method for performing testing consistent with laboratory-based EPA and California Air Resources Board (CARB) regulatory testing procedures for HDE "in-use" emissions compliance purposes. This teaches an apparatus and method for conducting standard regulatory testing while the HDE remains installed in a vehicle, essentially using the vehicle chassis and external drive-axle dynamometers in place of a traditional engine dynamometer. Accurate corrections for small errors in work done due to typical drivetrain losses between an engine and the dynamometers are also part of the method for obtaining accurate results that correlate with the standard regulatory testing methods.

Traditional laboratory testing of heavy-duty engines by regulatory bodies for certification and compliance purposes requires testing the ermine on an engine dynamometer or the powertrain on a powertrain dynamometer. This is not cumbersome for engine development and certification purposes but is very cumbersome for in-use compliance purposes. Because in-use emissions and fuel consumption testing relates to engines that have already been entered into commerce, the engines needed for testing are already installed in vehicles and owned by customers. Because it is technically difficult and time consuming to remove such engines, it is difficult to conduct a compliance program for which there would be enough owners willing to allow regulatory agencies to remove and test their engines and difficult to remove and test enough engines to establish a broad and meaningful testing program. Embodiments seek to overcome these difficulties of conducting a broad and meaningful compliance program for heavy-duty engines, without compromising on the representativeness and quality of the emissions and energy consumption measurements.

An object is to provide an apparatus and associated method for emissions and fuel consumption testing of an engine while the engine remains unmodified in a vehicle chassis and provides test results that correlate with, and are equivalent to test results that would be obtained using the standard regulatory testing apparatuses and procedures. To accomplish this, energy and torque losses between the engine and the dynamometers should be accurately accounted for while the engine torque map is developed and in subsequent engine testing based on the torque map. And a method for operating the engine over the kill range of torque and speed, while in-chassis, will be disclosed.

Rather than remove an engine from a donor vehicle with an engine model or configuration desired to be tested, as would have to be done prior, the vehicle is brought into a specially-equipped laboratory and is placed in an appropriate transmission gear. The laboratory is equipped with an "x-E" electric dynamometer apparatus where "x" stands for the variable number of drive axles which may be encountered. For example, a "2-E" or "4-E" dynamometer configuration is comprised of either two or four separate electric dynamometer units, respectively, one for applying load to each drive axle end, the number of drive axles depending on the type of truck chassis. Special test wheels are provided and installed in place of each driven standard wheel. During testing, the test wheels allow the axles to "freewheel" within the test wheels while turning attached dynamometers. The ends of each drive axle are attached to the separate dynamometer units for loading in accordance with the standard or other dynamometer load schedule, as desired.

A dynamometer torque versus speed map is first created by measuring the dynamometer torque at the Wide-Open-Throttle (WOT) or full accelerator pedal depression as the dynamometer programmatically controls the engine speed from the minimum engine speed, e.g. idle speed, up to the maximum engine speed as is normally done prior to an EPA or regulatory engine test.

The dynamometer torque versus speed map is then corrected to create an engine torque versus speed map. This is done by correcting the dynamometer torque and speed tar the effective gear ratio between the engine and the dynamometers and by correcting the dynamometer torque for the torque losses that occur between the engine and the dynamometers, due to the losses in drivetrain mechanical components found between the engine and the dynamometer, e.g. the transmission and a differential. Because the torque losses result in heat generation within the powertrain components, the magnitudes of the losses can be estimated by measurement of the heat generation combined with an understanding of machine design to guide the correct proportioning of the total heat generation as a function of torque and speed. Use of a fixed gear ratio makes this process easier to apply. For subsequent testing, the engine torque versus speed test schedule is then determined in the usual manner, based on the resulting, corrected engine map.

The engine test is conducted by controlling the engine speed, based on the speed test schedule, using the set of axle shaft dynamometers. Simultaneous control of the engine "throttle" or rack position to achieve the required test schedule torque, e.g. by using a robotic driver operating the accelerator pedal, or a servo motor to control the rack position, ensures the test schedule is followed. A robotic driver is also used to depresses the clutch at the appropriate times to simulate idle periods.

While the test is being conducted, exhaust emissions are sampled, mass emissions, engine work, and brake-specific, weighted test cycle emissions and fuel consumption rates are calculated and reported for comparison to emissions standards in the usual manner for engine dynamometer testing for compliance purposes.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
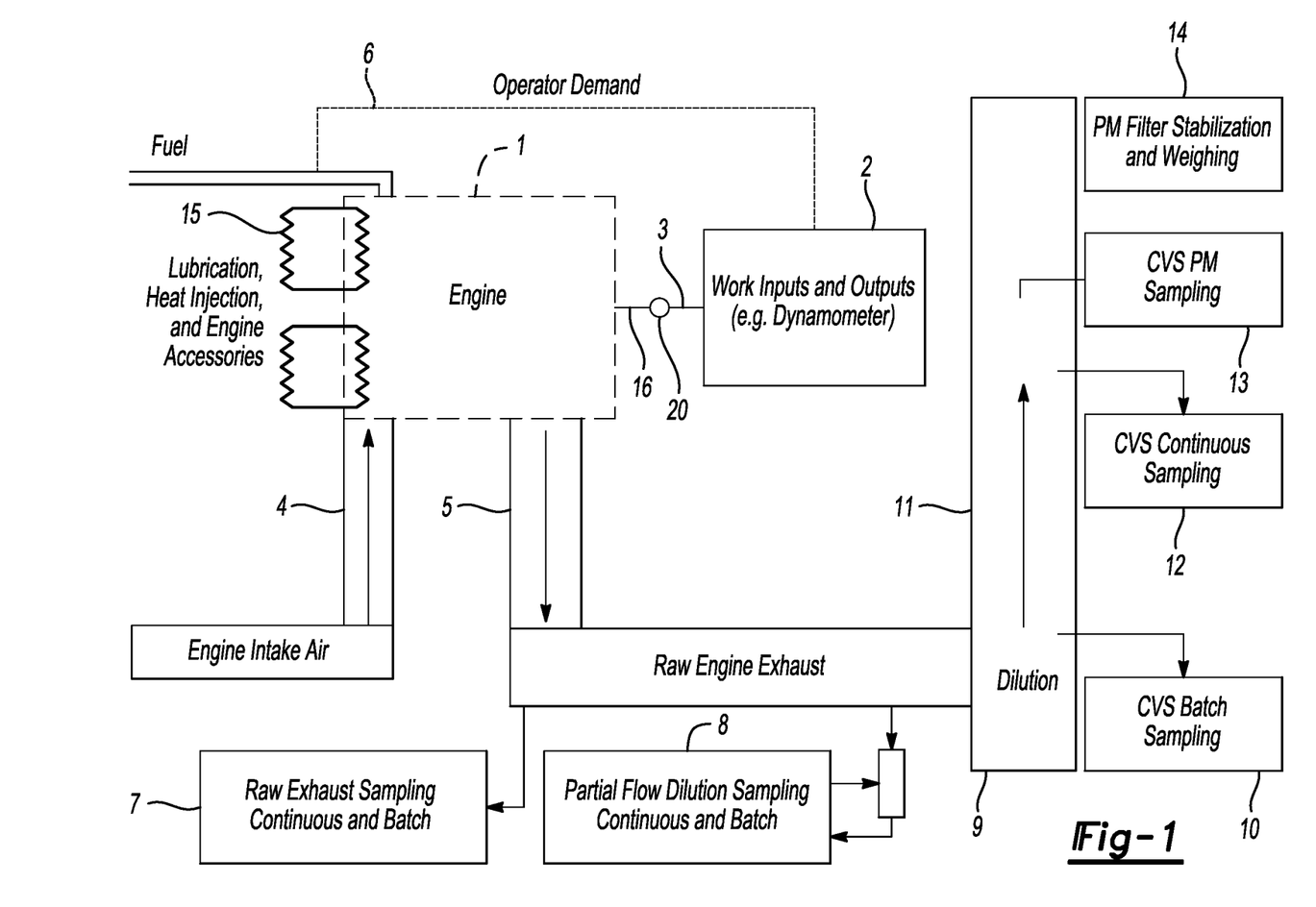
FIG. 1 shows a traditional engine dynamometer and associated emissions sampling equipment.

FIG. 1 shows how a traditional engine dynamometer test stand is used for Environmental Protection Agency (EPA) and California Air Resources Board (CARB) regulatory testing purposes for certification and laboratory-based compliance testing. An engine test stand employing an engine dynamometer 2 is used to control the engine speed and load of a heavy-duty engine 1 being tested, in accordance with a required normalized engine torque and speed test schedule, while simultaneously sampling exhaust gas emissions and measuring and recording engine torque and speed. Test results are normally calculated in terms of the mass of each sampled pollutant, e.g. grams, per work done by the engine, e.g. brake-horsepower-hour of work done by the engine (or g/kwh), over the chosen speed/load-based test schedule. The work done is based on the recorded engine torque and speed.

In the normal procedure, the engine 1 to be tested is placed on the engine dynamometer test stand (not shown) in the laboratory. The output shah of the engine 16 is connected to the pilot shaft 3, which is connected to the input shaft (not shown) of the electric dynamometer 2. The pilot shaft 3 has a pillow bearing 20 for constraining sideways movements of the shaft 3. A cooling system 15 for the engine oil, coolant, and intercooler, if so equipped, is provided. A fuel supply 17 and a clean source of intake air 18 are also provided for charging the engine 1 combustion chambers.

Engine intake air 4 is supplied to the engine 1. The raw engine exhaust 5, comprising exhaust gases and Particulate Matter (PM) may be sampled raw with raw sampling equipment 7, partially diluted with partial dilution sampling equipment 8, or may be fully diluted with dilution air 9 in dilution line 11, prior to encountering Constant Volume Sampling (CVS) batch sampling equipment 10, CVS continuous sampling equipment 12, CVS particulate matter (PM) sampling equipment 13, or PM filter stabilization and weighing equipment 14.

EPA and other regulatory testing protocols require the torque output and speed of the engine 1 to be controlled in accordance with a "normalized" reference load and speed, respectively. The actual reference torque of the engine 1 in ft-lbs and the actual reference speed of the engine 1 in RPMs and or N-m are both determined by an established "mapping" procedure for the engine 1, conducted at a Wide-Open-Throttle (WoT) condition on the dynamometer 2, prior to conducting the actual test. The engine 1 throttle is automatically controlled using a throttle control signal or mechanism 6. The control mechanism 6 is an electronic signal, in the case of electronically-controlled fuel injection system, or a servo motor (not shown) acting on a throttle controller mechanism (not shown) connected to the engine 1 throttle lever, in the case of a mechanically-controlled throttle.

During the normal mapping procedure, the engine is maintained at WOT while the dynamometer 2 controls the engine 1 speed from idle speed, through the engine's rated speed, and to a maximum zero-torque engine speed. The torque output of the engine 1 is measured by a load cell (not shown) applied to the pilot shaft 3 connecting the engine output shaft 16 to the dynamometer input shaft 3. The engine speed is also determined by measuring the dynamometer 2 speed, as they are usually equal due to a 1:1 gear ratio.

The "normalized" test cycle is then applied to the engine's 1 torque versus speed map from the mapping procedure, resulting in a second-by-second, custom engine torque and engine speed reference cycle for controlling the specific engine in subsequent transient or steady-state testing procedures.

For testing the engine 1 over standard testing cycles, the dynamometer 2 is then controlled in speed-control mode, whereby the speed of the dynamometer, and therefore the speed of the engine is controlled to the custom reference speed for the test engine 1. The engine 1 output torque is controlled to the custom reference torque, as calculated and described above.

The measured engine 1 speed and measured engine 1 output torque over the test cycle are recorded and subsequently used to compute the instantaneous and integrated actual work done by the engine over the entire test cycle, in brake-horsepower-hour or N-m/s.

Figure 2:
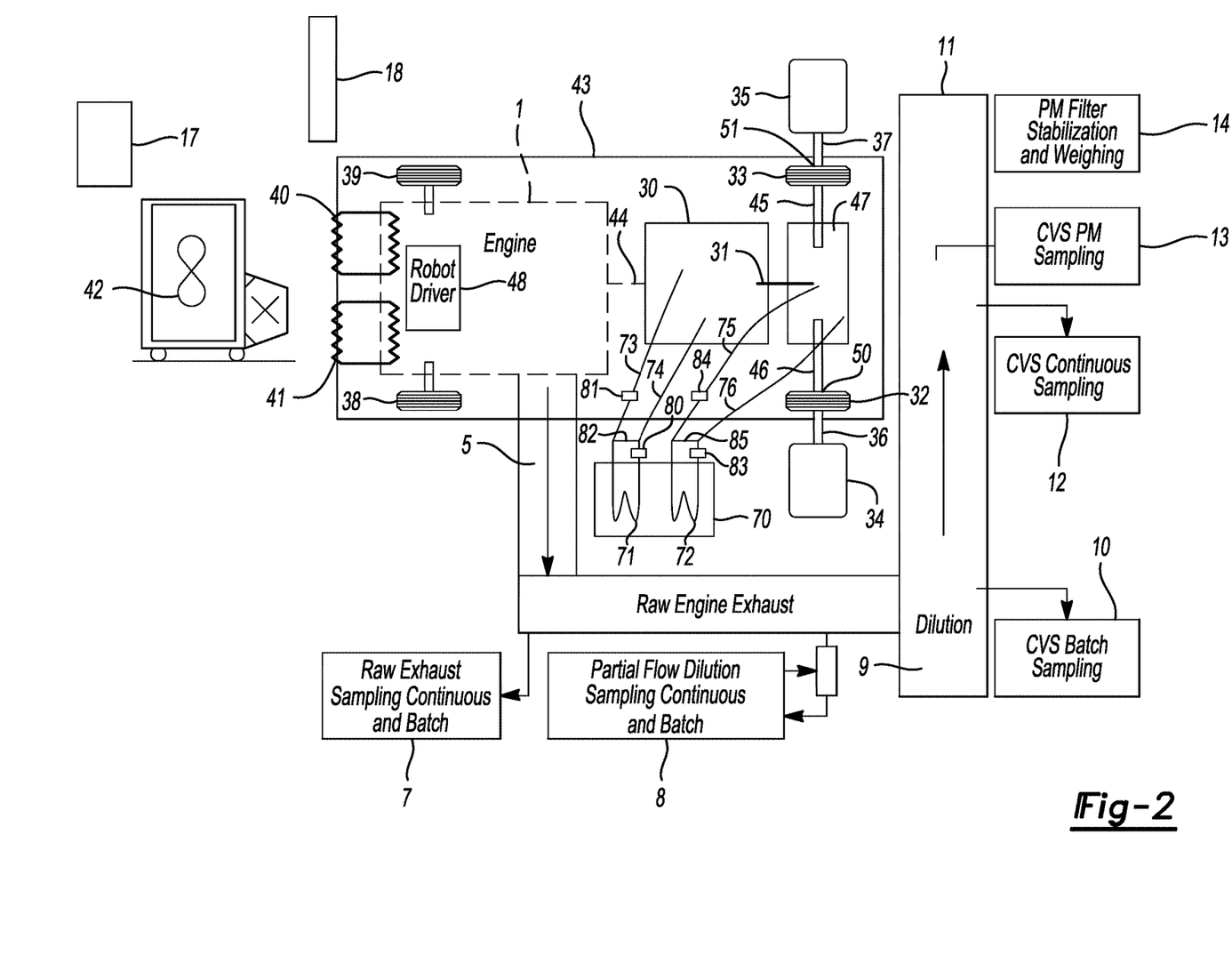
FIG. 2 shows a heavy-duty truck connected to a "2-E" dynamometer apparatus and associated emissions sampling equipment.

While the engine is operated over the test cycle, emissions are continuously sampled as described above, to determine the total mass emissions of each pollutant of interest in grams over the entire test cycle. When emissions concentrations are measured continuously, modal mass emissions and modal brake-specific mass emissions and fuel consumption can be calculated versus time. When emissions are only "bag-sampled," then only cycle-based emissions results and fuel consumption values are calculated. For the cycle-based values, the total grams of each pollutant is divided by the total test cycle work to determine the mass of each pollutant per work done, or grams of each pollutant per BHP-HR (or grams per kW-hr), FIG. 2 shows how the engine 1 can be tested while it remains in the vehicle chassis 43, to provide equivalent results obtained in the regulatory testing manner described above. The chassis 43 itself serves as an engine test stand (not shown), the vehicle transmission 30, drive shaft 31, rear differential 47, and axles 45, 46, serve in place of the pilot shaft 3, and the pilot shaft pillow bearings. Output dynamometer torque 44 is shown between the engine 1 and the vehicle transmission 30. The wheel pillow bearings 50, 51 are mounted within modified drive wheels 32, 33. Wheels 38, 39 are also shown. Dynamometers 34, 35 are movable, mounted on a bed plate (not shown), and serve analogously to the engine dynamometer 2. Dynamometer input shafts 36, 37 are connected with the dynamometers 34, 35 respectively. A robotic driver 48 serves as the throttle control mechanism 6 for both electronically-controlled and mechanically-controlled engines. While direct electronic throttle control can also be implemented, mechanical manipulation of the power control is preferable for regulatory purposes because it is more like real-world operation.

Engine and auxiliary system cooling is provided by the vehicle cooling system 40, comprised by heat radiators and a fan in the normal manner, and oil cooler 41. Cooling is enhanced by the external fan 42 because the vehicle chassis 43 remains stationary during testing. This is analogous to how light-duty vehicle testing is typically performed.

All testing is done while maintaining a constant bulk temperature of the transmission oil by circulating the transmission oil from the transmission 30 and through the external heat exchanger 71 which exchanges heat with a constant temperature bath 70 via a supply hose 73 and a return hose 74, respectively. Two different temperature baths may be used for the two different fluids. For vehicles equipped with transmission oil temperature sensors, the sensor is either removed from the normal location on the vehicle chassis and placed in the transmission oil coolant loop, or an identical sensor is placed in the oil coolant loop and connected to the normal wiring harness inputs in place of the original sensor.

If the vehicle is equipped with a transmission oil cooler, the cooler is disconnected and the supply and return lines are plumbed to an external cooler for which a constant temperature can be maintained. The setpoint temperature to be maintained is the normal operating temperature of the transmission oil. Otherwise the transmission oil is circulated to the external cooler using an external pump 80. In either case, a flow meter 81 is installed in either the supply or return line for measuring the volumetric flow rate, and a differential thermocouple 82 is installed across the supply and return lines for measuring the temperature difference between the supply and return oil temperatures.

All testing is also done while maintaining a constant bulk temperature of the gear oil in the rear end differential housing 47 by circulating the gear oil from the housing 47 through an external heat exchanger 72 which exchanges heat with either the same constant temperature bath 70 or with another constant temperature bath (not shown) maintained at a desired temperature. The gear oil is circulated externally to the heat exchanger using an external gear oil pump 83, a supply line 75 and a return line 76, respectively. A flow meter 84 is installed in either the supply or return line for measuring the volumetric flow rate, and a differential thermocouple 85 is installed across the supply and return lines for measuring the temperature difference between the supply and return gear oil temperatures.

Maintaining constant fluid temperatures within the transmission 30 and rear differential 47 preferably results in warming the fluids prior to the beginning of the testing process to reduce viscous drag and the resulting energy losses within the transmission 30 and the rear differential 47. And it preferably results in cooling the fluids during high speed and high torque operation to prevent damage to the infernal components and to prevent the viscosity of the fluids from being affected by the history or operation, i.e. to maintain a constant viscosity or the fluids so the energy losses in the transmission 30 and differential 47 are independent of operating history and time.

Exhaust Emissions are sampled from the tailpipe of the vehicle 43 in the same manner as previously described for engine testing in a laboratory.

Besides the locations of the dynamometers, the main difference between the in-chassis engine testing apparatus shown in FIG. 2 and the standard engine testing apparatus shown in FIG. 1 is the inclusion of the vehicle transmission 2, rear differential 47, and additional dynamometer shafts and pillow bearings. Therefore, it is necessary to measure or estimate the torque losses associated with these items and account for those losses, as accurately as possible by modified testing procedures to obtain equivalence and correlation with emissions and energy efficiency testing conducted with the apparatus shown in FIG. 2, compared with testing conducted in the normal manner with the apparatus shown in FIG. 1.

The method for conducting testing with the apparatus shown in FIG. 2 will now be described with reference to the procedure outlined in FIG. 3.

A heavy-duty vehicle for which an emissions test is to be conducted is brought into a testing laboratory equipped with the apparatus shown in FIG. 2. A robotic driver is installed in the vehicle to operate the accelerator pedal and the clutch pedal for controlling the engine torque and to temporarily disconnect the engine from the driveline, respectively, during idle engine operation, as required by the test cycle. The most appropriate gear for testing is selected based on the ability to achieve the required torque and speed points per the regulatory procedure being followed. Generally speaking, the most appropriate transmission gear will be the highest gear (maximum axle 45, 46 rotational speeds) that can be used to successfully achieve the desired engine speeds as a function of time, i.e. the highest gear with sufficient transient engine speed response, while also preventing the rotational speeds from exceeding the design limits of the dynamometers 34, 35 when the engine is operated at its rated speed. All subsequent mapping and testing will be done using this selected transmission 2 gear.

Figure 3:
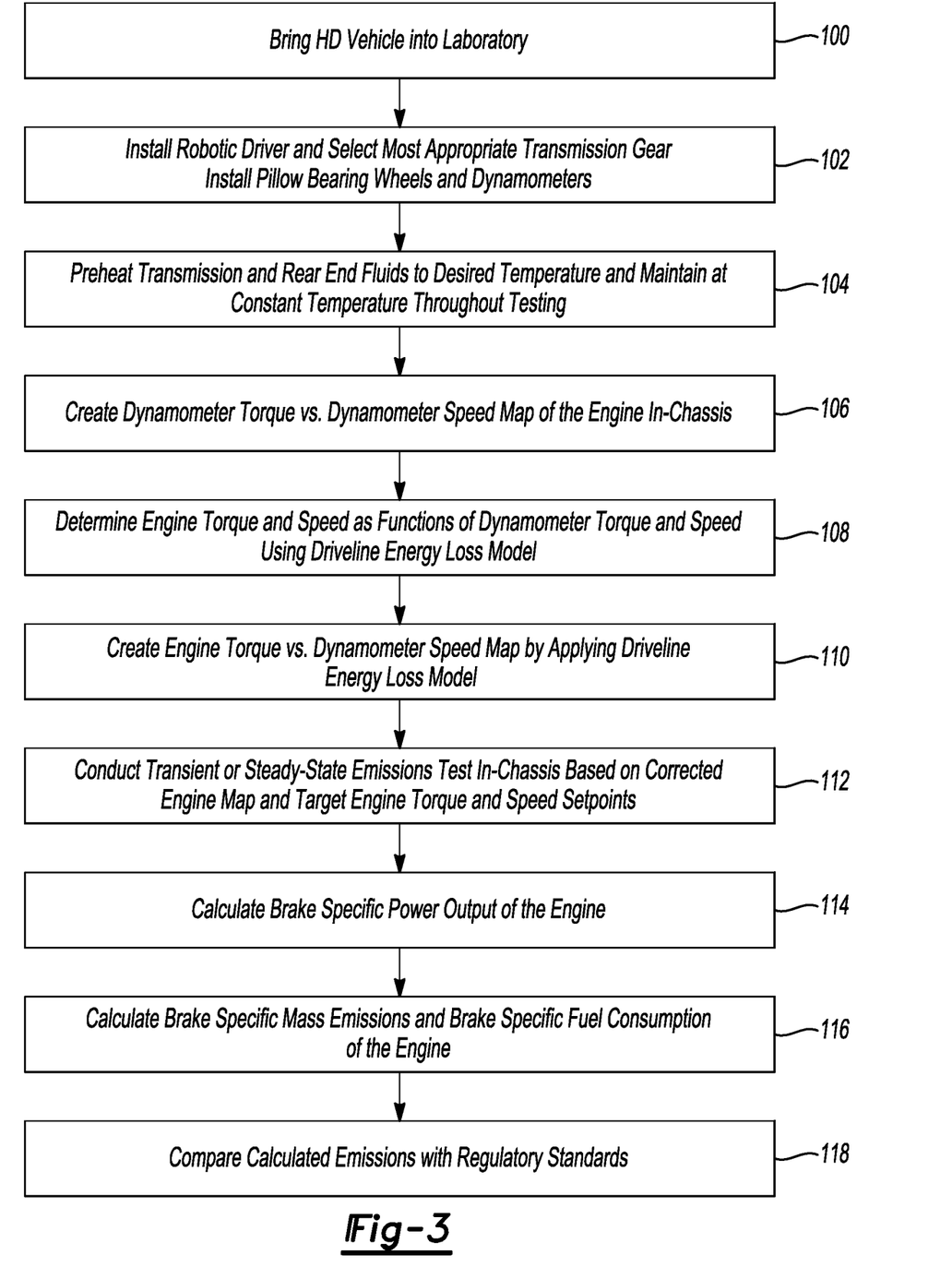
FIG. 3 shows the procedure for conducting a laboratory-based engine dynamometer emissions test on an engine in a vehicle chassis.

With reference to FIG. 2 and FIG. 3, special pillow bearing hub 50, 51 wheels 32, 33 are installed and dynamometers 34, 35 are attached to the end of each drive axle. For some tests, it may be desirable to connect two or more drive axles together so they operate in tandem, thereby reducing the total number of e-dyno dynamometers needed. The special wheels 32, 33 allow the vehicle 43 to be movable inside the laboratory as well as easily connected to the dynamometers 34, 35 during testing, without having to raise the vehicle 43 off the ground or remove the wheels each time the vehicle is moved.

Circulation of the transmission oil and the rear end gear oil is commenced prior to testing to bring the oil temperatures to the desired, constant setpoint. If the vehicle has not been operating, this would likely involve raising the fluid temperatures to a temperature considered to be normally operating temperature. Once the setpoint temperatures are achieved, engine 1 operation can begin while the setpoint temperatures are maintained throughout the subsequent testing operations by the heat exchangers 71, 72.

Either a driveline energy loss model is selected or a "coastdown" procedure is used to estimate driveline losses that occur between the engine 1 and the dynamometers 34, 35, due to the driveline components not normally present during traditional laboratory engine testing. The driveline energy model could be a simple model for which the energy losses have a maximum value and are a function of engine speed only, a more sophisticated model for which the energy losses have a maximum value and are a function of both engine speed and load, or could be a constant percentage of the measured torque or power measured at the dynamometers 34, 35.

An alternative driveline energy loss model that could be used is based on actual dynamometer measurements using a "coastdown" procedure analogous to a coastdown procedure used to determine road load losses from a vehicle and normally conducted on a flat track with low winds. The present method does not specify any single energy loss model to be used, but contemplates the use of any energy loss model that is considered appropriate for the application.

If a "coastdown" procedure is chosen to be used, the mass of the rotating components should be known to determine the no-load torque exerted by the powertrain components and testing apparatus components that lie between the dynamometers 34, 35 and the engine 1. The vehicle clutch is depressed using the robotic driver 48, disengaging the engine 1 from the transmission 2. The dynamometer 34, 35 controls are set to "speed mode" control and the dynamometer 34, 35 speeds are gradually raised to a speed exceeding the maximum speed needed during the actual emissions test. Once the higher than maximum speed is attained, the dynamometers 34, 35 are then set to a "no-load" torque condition while the transmission 2 and other rotating driveline components are free to rotate while they come to rest due to driveline frictional and other losses. The dynamometer 34, 35 rotational speeds (may not be the same—may need to use 1 dyno to balance speeds and take this balancing into account in the calculations?) are measured throughout the process as a function of time, in a manner that is analogous to both vehicle road load coastdown procedures on a track and coastdown procedures used determining the losses associated with water-brake chassis dynamometers.

The driveline coastdown rotational speed vs. time data is then used to calculate the torque losses associated with the post-engine driveline components as a function of dynamometer rotational speed.

Yet another driveline loss model which can be employed is based on a direct measurement of the driveline losses using the dynamometers while the clutch pedal is depressed, thereby disengaging the engine.

The robotic driver 48 is commanded to release the vehicle clutch pedal while the engine speed is maintained at the previous idle speed by the engine dynamometer in speed mode. The robotic driver 48 is then commanded to achieve WOT, after which the dynamometers 34, 35 speeds are controlled to ramp up the engine 1 speed in the normal manner from a minimum or idle speed to a maximum speed per the regulatory procedures while measuring the torque applied to the dynamometers 34, 35 at WOT.

Perhaps the easiest and most accurate method to implement driveline loss model is based on estimating the transmission 30 and rear differential 47 losses for the overall test cycle based on continuously measuring the heats rejected from the transmission 30 and differential 47 fluids respectively, as time progresses. For example, if the supply and return temperatures, and the flow rates of the fluids circulated to the heat exchangers 71, 72 were all measured, and thermal properties of the fluids were known or measured in advance, the heat rejection rate from the transmission 30 and from the differential 47 can be easily expressed.

Because of transport delays and the heat capacities of the transmission 30, differential 47, and external cooling system 70, it would be difficult to calculate the heat loss with enough resolution in time to be useful for correcting the torque in real time, without prior measurements of the losses, which can be conducted during the pre-test engine 1 mapping procedure. Thus, the total heat loss over the cycle can be accurately summed and later attributed to the appropriate engine 1 operating conditions of its origins. This is possible because losses in both components are in proportion to both applied torque and rotational speed. Corrected engine maps, dynamometer 34, 35 torque and speed target setpoints, and corrected test results can be determined in this way through post-processing.

This last driveline energy loss model is preferable for obtaining accurate results and ease of testing. Its use in correcting the engine map and test results are explained below in greater detail. In preparation for engine dynamometer testing to create a torque vs. speed engine map for the engine 1, the transmission 30 and rear differential 47 fluids are circulated by pumps 80, 83 at measured flow rates using flowmeters 81, 84, and brought to a chosen or desired stabilized temperature using the circulation of the fluids through the external heat exchangers 71, 72. For vehicles equipped with transmission 30 oil coolers, the vehicle 43 cooling loop is rerouted so the oil to be cooled is carried through supply and return lines using either the transmission's 30 own oil pump (not shown), or an externally mounted oil pump 80. A separate pump 83 and set of cooling lines 75, 76 are added for maintaining a constant return temperature of the differential 47 oil.

Each cooling loop has its own differential thermocouple 82, 85 for measuring the temperature difference between the supply and return lines. Reaching stabilized temperature conditions can be judged by achieving a small, acceptable heat flow rate on each of the cooling loops.

The instantaneous heat rejection rate associated with an external transmission 30 fluid cooling loop can be expressed as:

$$\frac{dQ_t}{dt} = \rho_t(T)\frac{dV_t}{dt}c_{pt}(T)\Delta T_t \quad \text{[Equation 1]}$$

Where $\rho_t(T)$ is the density of the transmission 30 fluid as a function of temperature, $$\frac{dV_t}{dt}$$

is the volume flow rate measured by the transmission fluid flowmeter 82, and $c_{pt}(T)$ specific heat capacity at constant pressure, at temperature T, of the transmission 30 fluid, and $\Delta T_t$ is the temperature difference between the supply and return temperatures of the transmission fluid entering and exiting the transmission fluid heat exchanger 71, as measured by the transmission fluid differential thermocouple 82.

Therefore, the total heat rejected to an external transmission fluid heat exchanger 71 during an extended dine duration T+, a duration which intentionally exceeds the test schedule or mapping procedure time duration T, as applicable, can be expressed as:

$$Q_t = \int_0^{T+} \rho_t(T)\frac{dV_t}{dt}c_{pt}(T)\Delta T_t dt \quad \text{[Equation 2]}$$

$\rho_t(T)$ and $c_{pt}(T)$ are fluid properties either provided by the manufacturer of the transmission fluid or, alternatively, properties that are readily measured using specialized fluid density measurement instruments and a calorimeter, respectively, instruments easily purchased.

$$\frac{dV_t}{dt},$$

the instantaneous volume flow rate of the transmission fluid in the transmission heat rejection fluid loop, is readily measured with ultrasonic-based fluid flow meters 81, and $\Delta T_t$ is easily measured directly with a differential thermocouple 85.

Likewise, the instantaneous heat rejection rate associated with an external differential 47 lubricant cooling loop can be expressed as:

$$\frac{dQ_d}{dt} = \rho_d(T)\frac{dV_d}{dt}c_{pd}(T)\Delta T_d \quad \text{[Equation 3]}$$

Where $\rho_d(T)$ is the density, $$\frac{dV_d}{dt}$$

is the volume flow rate as measured with the differential fluid flow meter 84, $c_{pd}(T)$ is the specific heat capacity at constant pressure, as a function of temperature, of the differential lubricating oil, and $\Delta T_d$ is the temperature difference between the supply and return temperatures of the differential fluid entering and exiting the differential lubricant heat exchanger 72, measured using the differential fluid flow differential thermocouple 85, and the flow measured by the differential fluid flow meter 84.

Therefore, the total heat rejected to the external differential lubricant heat exchanger 72 during an extended time duration T+, a duration which intentionally exceeds the test schedule or mapping procedure time duration T, as applicable, can be expressed as:

$$Q_d = \int_0^{T+} \rho_d(T)\frac{dV_d}{dt}c_{pd}(T)\Delta T_d dt \quad \text{[Equation 4]}$$

$\rho_d(T)$ and $c_{pd}(T)$ are fluid properties either provided by the manufacturer of the differential lubricant fluid or, alternatively, properties that are readily measured using specialized fluid density measurement instruments and a calorimeter, respectively, instruments easily purchased.

$$\frac{dV_d}{dt},$$

the instantaneous volume flow rate of the differential lubricant fluid in the transmission heat rejection fluid loop, is readily measured with ultrasonic-based fluid flow meters, and $\Delta T_d$ is easily measured directly with a differential thermocouple.

One of ordinary skill in machine design understands that energy losses of geared and rotating machinery is mostly due to frictional forces between meshing components that are approximately proportional to the applied forces and speeds of movement, and bearing friction approximately proportional to the speeds of rotation, respectively. Therefore, good approximations for the losses in the transmission, with operations restricted to a single gear, and the losses in the differential can be expressed as:

$$\frac{dQ_t}{dt} = K_t T_t n_t \quad \text{[Equation 5]}$$

For fixed transmission gear operation,

Where $K_t$ is an unknown constant for the transmission restricted to operation in a single gear ratio, $T_t$ is the applied torque on the transmission 30 from the engine 1, and $n_t$ is the rotational speed of the transmission 30 expressed in revolutions per minute. But because of the single transmission gear ratio restriction, $$\frac{dQ_t}{dt} = K_t' T_{dyno} n_{dyno} \quad \text{[Equation 6]}$$

Where $K_t'$ is also a constant. Therefore, $$K_t' \int_0^T T_{dyno} n_{dyno} = \int_0^{T+} \rho_t \frac{dV_t}{dt} c_{pt} \Delta T_t dt \quad \text{[Equation 7]}$$

Or $$K_t' = \int_0^{T+} \rho_t \frac{dV_t}{dt} c_{pd} \Delta T_d dt \Big/ \int_0^T T_{dyno} n_{dyno} dt \quad \text{[Equation 8]}$$

Which is the energy loss in the transmission 30 per unit of work done on the dynamometers 34, 35. Therefore, the instantaneous heat generation rate within, or power loss due to transmission 30 inefficiencies can be written as:

$$\frac{dQ_t}{dt} = \left( \int_0^{T+} \rho_t \frac{dV_t}{dt} c_{pt} \Delta T_t dt \Big/ \int_0^T T_{dyno} n_{dyno} dt \right) T_{dyno} n_{dyno} \quad \text{[Equation 9]}$$

Similar reasoning, applied to the different, results in:

$$\frac{dQ_d}{dt} = \left( \int_0^{T+} \rho_t \frac{dV_d}{dt} c_{pd} \Delta T_d dt \Big/ \int_0^T T_{dyno} n_{dyno} dt \right) T_{dyno} n_{dyno} \quad \text{[Equation 10]}$$

Therefore, the instantaneous power output of the engine 1 can be expressed in terms of the power absorbed by the dynamometers 34, 35 as:

$$\frac{dW_e}{dt} = T_e n_e = T_{dyno} n_{dyno} + \quad \text{[Equation 11]}$$

$$\frac{\int_0^{T+} + \left( \rho_t \frac{dV_t}{dt} c_{pt} \Delta T_t + \rho_d \frac{dV_d}{dt} c_{pd} \Delta T_d \right) dt}{\int_0^T T_{dyno} n_{dyno} dt} T_{dyno} n_{dyno}$$

But $$n_e = q n_{dyno} \quad \text{[Equation 12]}$$

And $$n_{dyno} = \frac{1}{q} n_e \quad \text{[Equation 13]}$$

where q is the effective gear ratio between the engine 1 and the dynamometers 34, 35, and easily measured directly, or calculated from knowledge of the transmission 30 and differential 47 gear ratios, therefore:

$$T_e = \quad \text{[Equation 14]}$$

$$\frac{1}{q} \left( 1 + \frac{\int_0^{T+} + \left( \rho_t \frac{dV_t}{dt} c_{pt} \Delta T_t + \rho_d \frac{dV_d}{dt} c_{pd} \Delta T_d \right) dt}{\int_0^T T_{dyno} n_{dyno} dt} \right) T_{dyno}$$

And $$T_{dyno} = \quad \text{[Equation 15]}$$

$$q \Big/ \left( 1 + \frac{\int_0^{T+} + \left( \rho_t \frac{dV_t}{dt} c_{pt} \Delta T_t + \rho_d \frac{dV_d}{dt} c_{pd} \Delta T_d \right) dt}{\int_0^T T_{dyno} n_{dyno} dt} \right) T_e$$

It should be noted that the dynamometers 34, 35 are controlled to be equal speeds.

Engine Torque vs. Speed Mapping Procedure

Prior to operating the engine 1 according to a predetermined in-chassis engine testing schedule, e.g. the EPA HD transient cycle, the engine WOT torque versus engine speed is "mapped" in the normal manner for regulatory test procedures. The engine 1 is started and warmed-up to achieve normal operating temperature, prior to the mapping procedure, in accordance with the relevant test procedures or regulations. Following the mapping of the engine described above, the engine is turned off.

During the entire engine mapping procedure of time duration T, and continuing for an extended, total period of time T+ for which $$T+ > T, \frac{dQ_t}{dt} \text{ and } \frac{dQ_d}{dt}$$

are continuously calculated and integrated until reaching acceptably low heat rejection rates after the engine 1 is turned off. The total summed or integrated heat flow rate over time T+ represents a good approximation for the total energy loss due to inefficiencies of the transmission 30 and differential 47 over an entire test cycle, in this case the mapping procedure.

The engine mapping procedure is conducted at WOT by using the dynamometers 34, 35 to control the engine 1 speed from a minimum speed, e.g. idle speed, to a maximum speed per the regulatory or other procedures. A corrected torque vs. speed curve for the engine, i.e. the "torque curve," based on the measured torque and speed at the dynamometers 34, 35 from the WOT mapping procedure is then calculated according to Equation 14 and Equation 12.

Following the procedure described above ensures the engine 1 torque map closely approximates the engine torque map obtained using the standard regulatory procedures. The "corrected engine torque" map versus engine speed is then used to obtain the test cycle reference torque and reference speed in the usual manner for laboratory-based, regulatory testing.

For operation over subsequent test cycles, the engine 1 speed is controlled by the dynamometers 34, 35 using the unnormalized reference speed in the usual manner. Whenever an idle period is encountered in the cycle, the robotic driver 48 is used to depress the clutch pedal (not shown), or alternatively, the dynamometers 34, 35 are used to maintain idle speed combined with a closed-throttle condition imposed by the robotic driver 48.

For each target engine torque setpoint and corresponding engine speed setpoint, there is a corresponding target dynamometer torque and corresponding dynamometer speed setpoint, given by Equation 15 and Equation 13, respectively. These are the target setpoints for the dynamometers 34, 35 control. Otherwise, the dynamometers 34, 35 are controlled in the normal manner for a regulatory test. Torque is dynamically controlled by commanding the robotic driver 48 to continuously achieve the desired dynamometer setpoint torque values while the speed is dynamically controlled by commanding the dynamometers 34, 35 to continuously achieve the desired dynamometer setpoint speed values.

During the engine testing following a given torque vs. speed test cycle or for which a predetermined engine torque and speed cycle is to be used, e.g. the EPA heavy-duty transient test cycle, emissions are sampled in the usual manner for laboratory-based, regulatory testing. And the engine 1 work and mass emissions are likewise calculated in the usual manners. With reference to the above equations for the transmission 30 and differential 47 energy losses, the total engine work over the entire test cycle is calculated in the following manner:

$$W_e = \\ W_{dyno} + \int_0^{T+} \rho_t \frac{dV_t}{dt} c_{pt} \Delta T_t dt + \int_0^{T+} \rho_d \frac{dV_d}{dt} c_{pt} \Delta T_d dt \quad \text{[Equation 16a]}$$

or $$W_e = \int_0^T T_{dyno} n_{dyno} + \\ \int_0^{T+} \rho_t \frac{dV_t}{dt} c_{pt} \Delta T_t dt + \int_0^{T+} \rho_d \frac{dV_d}{dt} c_{pt} \Delta T_d dt \quad \text{[Equation 16b]}$$

Where $W_{dyno}$ is the work done by the engine 1 on the dynamometers and calculated from measurements of the dynamometers 34, 35 measured torques and speeds. This is equivalent to the following expression:

$$W_e = \int_0^T T_e n_e dt, \text{ where } c \text{ is a constant} \quad \text{[Equation 17]}$$

Mass emissions per unit of engine work is then calculated and compared with the regulatory standard applicable to the particular engine 1 tested.

At operation 100, a heavy duty vehicle is brought into the laboratory. At operation 102, a robotic driver is installed and a most appropriate transmission gear is selected. At operation 104, transmission and rear end fluids are preheated to a desired temperature and maintained at constant temperature throughout testing. A dynamometer torque versus dynamometer speed map of the engine-in-chassis is created at operation 106. At operation 108, engine torque and speed are determined as functions of dynamometer torque and speed using a driveline energy loss model. At operation 110, an engine torque versus dynamometer speed map is created by applying a driveline energy loss model. At operation 112, transient or steady-state emissions tests are conducted in-chassis based on a corrected engine map and target engine torque and speed setpoints. A brake specific power output of the engine is calculated at operation 114. At operation 116, brake specific mass emissions and brake specific fuel consumption of the engine are calculated. At operation 118, calculated emissions with regulator standards are compared.

A method is provided for estimating torque or energy losses from a vehicle driveline component operating under transient conditions based on measuring the heat transfer from an associated lubricating fluid while the component is maintained at an isothermal ("constant hulk temperature") condition. The heat transfer is calculated based on measured values of the fluid flow rate (from an installed flow meter), a temperature difference between the supply from, and return to the component, and the heat capacity of the fluid.

A method is provided for apportioning total measured torque or energy losses from a vehicle driveline component operating under transient conditions, based on measured temporal operating states of the component.

An apparatus for determining energy or torque losses from a driveline component of a vehicle under test includes the circulation of the associated lubricating fluid from said component to a heat exchanger maintained in an isothermal state, returning the fluid to the component, measuring the flow rate of the fluid and the temperature difference across the heat exchanger, and calculating the losses based on the density and specific heat of the fluid.

A method for obtaining the "Wide Open Throttle" (WOT) map of an engine in a vehicle includes obtaining an approximate WOT map of the engine in the vehicle and correcting the approximate WOT map of the engine based on measured losses from driveline components located between the engine output shaft and the vehicle drive wheels.

A method is provided for obtaining an engine test stand brake specific fuel consumption and exhaust gas emissions compliance levels over a steady state or transient test cycle, using the vehicle chassis as a test stand.

A method for generating a WOT torque versus speed map of an engine installed in a vehicle includes the following steps: setting the throttle or pedal position to WOT or full torque position; variably controlling the rotational speeds of one or more dynamometers connected to the drive axle shafts of the vehicle to cause the speed of the engine to increase from an idle speed to a maximum speed; calculating the engine torque and engine speed based on temporal axle shaft dynamometer torques, dynamometer speeds, and a transmission gear ratio, or measured engine speed; and calculating the temporal engine torque values during a test corresponding to the measured dynamometer torque values. The method may further include estimating temporal torque or energy losses of driveline components located between the dynamometers and the engine output shaft of the vehicle based on the temporal drive axle dynamometer torques, the temporal dynamometer or engine speed, and the isothermal ("constant bulk temperature") heat transfer from driveline components during vehicle operation. The engine torque values may be calculated corresponding to the dynamometer torque values and based on the engine speed and corresponding driveline torque losses. Driveline components located between the engine and the dynamometers may be put into a known thermal state prior to increasing the speed of the engine.

A method for calculating an engine torque versus speed test schedule includes the following steps: mapping a WOT torque versus speed of an engine according to the method described in the preceding paragraph; and calculating an engine torque versus speed schedule based on a normalized torque versus speed schedule and the WOT or full torque versus speed map of the engine.

A method for controlling an engine installed in a vehicle to achieve a predetermined output engine torque includes the following steps: measuring drive axle torques of the vehicle with dynamometers; measuring an engine speed or a dynamometer speed; estimating the torque losses between the dynamometers and the engine of the vehicle based on the drive axle torques and the engine speed or the dynamometer speed; calculating a target dynamometer torque value corresponding to the predetermined output engine torque value based on the torque losses and the engine speed; and controlling a pedal position or a torque control of the vehicle based on the target dynamometer torque value.

A method for causing an engine installed in a vehicle to follow a predefined engine torque vs engine speed schedule includes the following steps: controlling the dynamometer or engine speed based on the predefined engine speed schedule; and controlling the engine torque according to the method described in the preceding paragraph, and according to the predefined torque schedule, (and in coordination with the dynamometer or engine speed schedule). The predefined engine torque versus engine speed schedule may be based on a normalized engine torque versus engine speed schedule and a WOT torque versus speed engine map.

A testing method for determining the work done by an engine installed in a vehicle includes the following sequence of steps: calculating the work done by the engine on axle shall dynamometers; estimating the losses of drivetrain components located between the engine and the dynamometers; and calculating the total work done by the engine based on the work done by the engine on axle shaft dynamometers and the estimated losses of drivetrain components located between the engine and the dynamometers.

A testing method for determining the brake specific exhaust emissions or fuel consumption of an engine installed in a vehicle includes the following steps: controlling an engine over a desired test cycle; measuring exhaust mass emissions or fuel consumed; calculating a work done by the engine, calculating the brake specific emissions or brake specific fuel consumption by dividing the mass emissions or fuel consumed by the work done by the engine.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method for testing an engine in a vehicle, the method comprising:
   arranging a bath separate from the vehicle configured to cool a driveline component of the vehicle;
   adjusting a temperature of the driveline component to a target temperature;
   responsive to the driveline component achieving the target temperature,
      operating the engine according to a mapping procedure, and
      controlling the bath to maintain the temperature of the driveline component at the target temperature during the operating;
   measuring heat transfer from the driveline component to the bath during the operating; and
   calculating torque loss or energy loss of the driveline component during the operating based on the heat transfer.

2. The method of claim 1, wherein the measuring further includes measuring the heat transfer after the operating.

3. The method of claim 1 further comprising discontinuing the measuring responsive to a predefined condition being met.

4. The method of claim 1 further comprising determining set points to define a test schedule based on (i) the mapping procedure and (ii) the torque loss or energy loss.

5. The method of claim 4 further comprising, while operating the engine according to the test schedule, recording torque and speed of a dynamometer operatively arranged with the vehicle.

6. The method of claim 5 further comprising while operating the engine according to the test schedule, measuring heat transfer from the driveline component to the bath.

7. The method of claim 6 further comprising determining total work performed by the engine based on (i) the torque and speed and (ii) the heat transfer from the driveline component to the bath while operating the engine according to the test schedule.

8. The method of claim 7 further comprising calculating total brake specific emissions from the engine based on the total work.

9. The method of claim 8 further comprising associating portions of the total work with operating points corresponding to the set points.

10. The method of claim 9 further comprising calculating temporal brake specific emissions based on the portions.

11. A method for testing an engine in a vehicle, the method comprising:
arranging a bath separate from the vehicle configured to cool a driveline component of the vehicle;
adjusting a temperature of the driveline component to a target temperature;
responsive to the driveline component achieving the target temperature,
operating the engine according to a test schedule, and
controlling the bath to maintain the temperature of the driveline component at the target temperature during the operating;
during the operating, measuring heat transfer from the driveline component to the bath, and torque and speed of a dynamometer operatively arranged with the vehicle;
calculating torque loss or energy loss of the driveline component during the operating based on the heat transfer;
determining total work performed by the engine based on the torque and speed, and the heat transfer from the driveline component to the bath; and
calculating total brake specific emissions from the engine based on the total work.

12. The method of claim 11, wherein the measuring further includes measuring the heat transfer after the operating.

13. The method of claim 11 further comprising, discontinuing the measuring responsive to a predefined condition being met.

14. The method of claim 11 further comprising associating portions of the total work with operating points corresponding to set points of the test schedule.

15. The method of claim 14 further comprising calculating temporal brake specific emissions based on the portions.

* * * * *